(No Model.)
F. HOLLAND.
CUTTER HEAD.
No. 326,983. Patented Sept. 29, 1885.
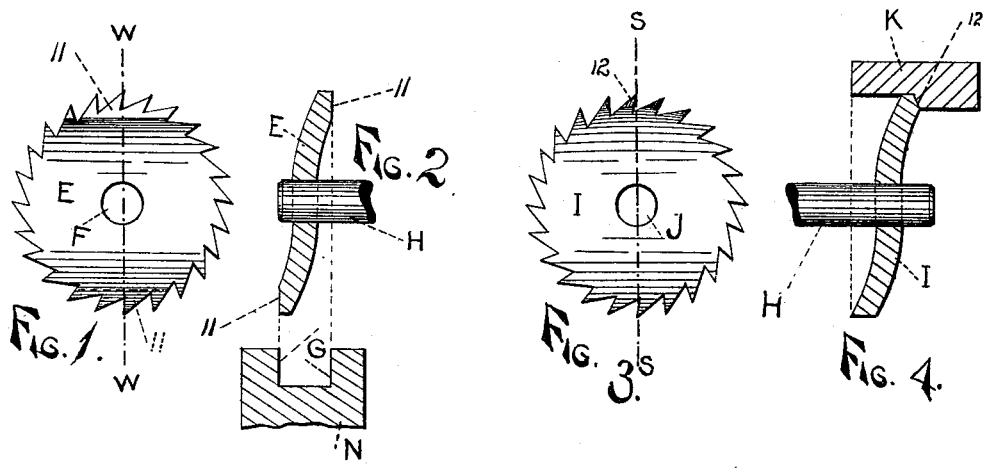
WITNESSES:
Fred N. Stevens
Everett D. Comstock
INVENTOR
Franklin Holland
BY
Edward Taggart
His ATTORNEY

UNITED STATES PATENT OFFICE.

FRANKLIN HOLLAND, OF GRAND RAPIDS, MICHIGAN.

CUTTER-HEAD.

SPECIFICATION forming part of Letters Patent No. 326,983, dated September 29, 1885.

Application filed December 24, 1884. (No model.)

*To all whom it may concern:*

Be it known that I, FRANKLIN HOLLAND, a citizen of the United States, residing at the city of Grand Rapids, in the county of Kent and State of Michigan, have invented a new and useful Cutter-Head for Wood-Working Purposes, of which the following is a specification.

My invention relates to a cutter-head constructed of suitable metal, and so bent or formed that a line drawn through one axis will be a reverse curve, and provided with teeth or cutters, as more fully described below; and the object of my invention is to so form the cutter-head that by filing the teeth or cutter in different shapes a variety of work can be done; also, to simplify the construction and render more efficient the cutter-head. These objects I accomplish by means of the mechanism illustrated in the accompanying drawings, in which—

Figure 1 is a side elevation of the cutter-head filed or formed to cut a dado or widened groove. Fig. 2 is a sectional view of Fig. 1 on line W W. Fig. 3 is a side elevation of the cutter-head when used as a panel-raiser; and Fig. 4 is a sectional view of Fig. 3 on line S S, together with a section of the panel cut or raised by this cutter-head.

Similar letters refer to similar parts throughout the several views.

It will be seen that the cutter-heads for panel-raising and dadoing are constructed in the same form exactly, except the teeth are filed differently. In the dado the sides of the groove are perpendicular with the bottom of the frame, and in the panel-raiser the panel may have perpendicular sides or slanting or other formed sides.

E in Fig. 1 is the cutter-head which cuts a dado or widened groove. The teeth are in the same circle or circles, of the same diameter, and parallel with each other, so that the bottom of the groove is straight in cross-section at the bottom.

F is the arbor-hole, and H the arbor. This cutter-head has its teeth filed with their one side filed perpendicularly to its axis, as shown by 11 11, so as to cut perpendicular sides to the dado G.

N shows a section of the work done by this filing. The dotted lines in Fig. 2 show how the cutter-head strikes the wood and cuts the dado groove.

I in Fig. 3 shows the side elevation of the cutter-head for raising panels, and the form of I is precisely the same as F, except the filing is upon one side only, as shown in Fig. 4, so as to make one side of the panel as shown by 12 in stock K.

It will be apparent that the form of the filing of the teeth or cutter may be varied so as to give different angles and forms to the sides of the grooves and panels.

By filing the cutter-head I, as shown at the bottom of Fig. 4, this cutter-head can be used for making a glue-joint.

My cutter-head is attached to its arbor in the ordinary manner. It is made thicker than an ordinary saw, and is of sizes to suit the purposes for which it is used, and can be adapted to a variety of uses to great advantage, the changes being made in each case by changing the shape or form of the teeth.

Having thus described my invention, what I claim to have invented, and desire to secure by Letters Patent, is—

1. As a new article of manufacture, the cutter-head having the double curve in one cross-section so that the cutters at one end of the section move in a circle on one side of the central point of revolution and the teeth at the other end of the curved cross-section move in a parallel circle on the other side of the center of revolution, substantially as described.

2. The cutter-head curved on the line of cross-section, said curve being S-shaped, and straight on the cross-section at right angles to the curved cross-section, substantially as described.

3. The reversely-curved cutter-head E, provided with the teeth 11, having their one side filed perpendicularly to the axis of the cutter-head to cut perpendicular sides to a dado or widened groove, substantially as described.

4. The reversely-curved cutter-head I, provided with teeth 12 for raising panels, said teeth being filed upon one side only, so as to make one side of the panel, substantially as shown and described.

FRANKLIN HOLLAND.

Witnesses:
EDWARD TAGGART,
FRED W. STEVENS.